Figure 4:
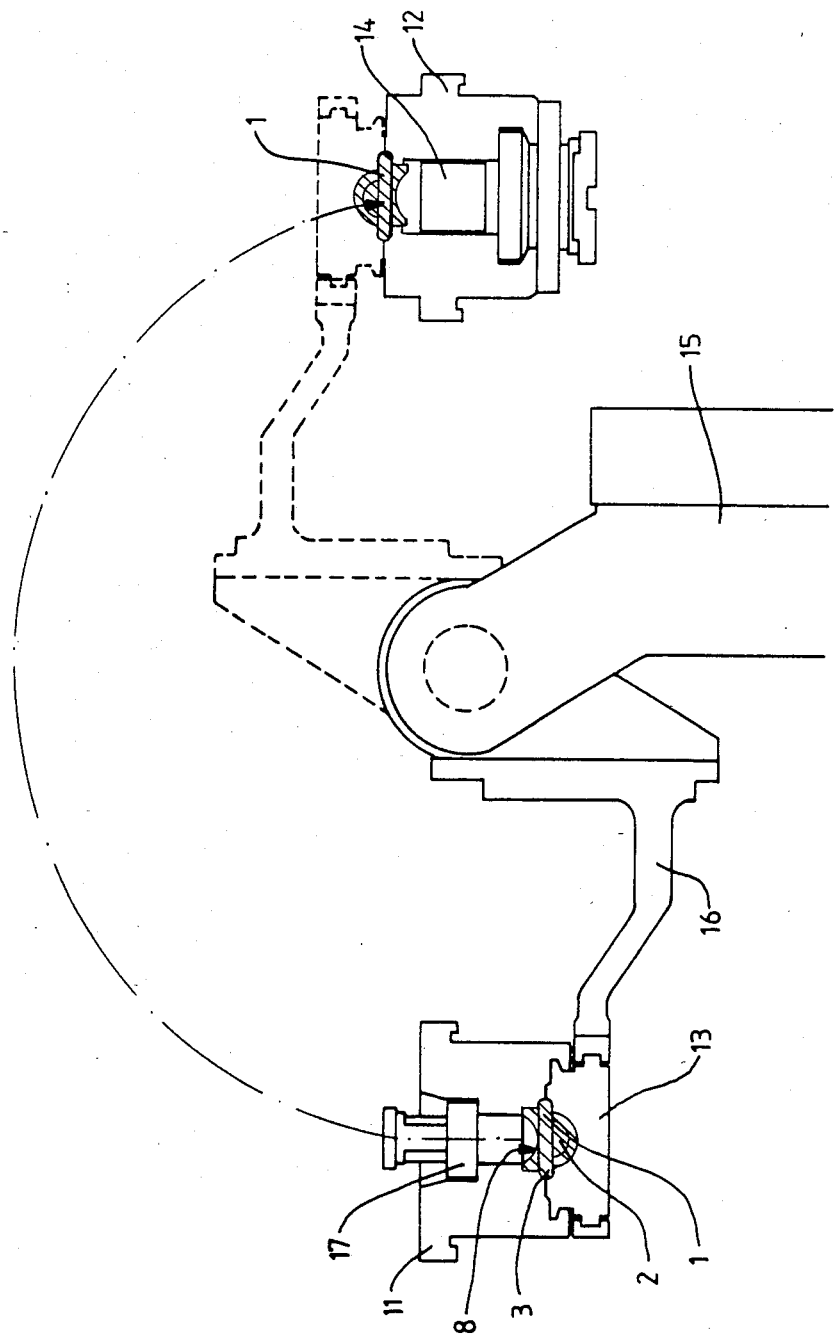

United States Patent [19]

Härkönen et al.

[11] Patent Number: 4,906,269
[45] Date of Patent: Mar. 6, 1990

[54] METHOD OF AND APPARATUS FOR MANUFACTURING A GLASS OBJECT

[75] Inventors: Esko Härkönen; Pekka Leppänen, both of Riihimäki, Finland

[73] Assignee: Riihimäen Lasi Oy, Riihimäki, Finland

[21] Appl. No.: 340,732

[22] Filed: Apr. 20, 1989

[51] Int. Cl.$^4$ ............................................. C03B 11/00
[52] U.S. Cl. ................................................ 65/68; 65/77; 65/83; 65/85; 65/226; 65/236; 65/260; 65/305; 65/306
[58] Field of Search .................. 65/68, 69, 77, 83, 85, 65/260, 226, 305, 306, 236

[56] References Cited

U.S. PATENT DOCUMENTS

| 1,844,549 | 2/1932 | Headley et al. | 65/260 X |
| 2,207,676 | 7/1940 | Berthold | 65/260 X |
| 3,477,841 | 11/1969 | Fouse | 65/226 X |
| 3,531,272 | 9/1970 | Menear | 65/69 X |
| 4,612,032 | 9/1986 | Nebelung | 65/165 |

FOREIGN PATENT DOCUMENTS

| 851400 | of 1952 | Fed. Rep. of Germany . |
| 1596581 | of 1971 | Fed. Rep. of Germany . |
| 3109575 | of 1982 | Fed. Rep. of Germany . |
| 82/02876 | of 1982 | PCT Int'l Appl. . |
| 26620 | of 1907 | Sweden . |
| 357351 | of 1973 | Sweden . |

Primary Examiner—Arthur Kellogg
Attorney, Agent, or Firm—Nixon & Vanderhye

[57] ABSTRACT

A glass object having protrusions and/or recesses, for example a glass lid (1) with a handle (2), is produced in an IS machine by pressing molten glass from above in a mould with the cover of the mould, in a mould defined by said cover, by a shaping mould (11) and by a mouth mould (13) disposed under the shaping mould. When the glass lid is formed its handle projects downwards and lies in the mouth mould. Subsequently the glass lid is transferred together with the mouth mould to the finishing mould (12) and is at the same time returned into a position in which the handle projects upwards in the finishing mould in which it is cooled supported by the finishing mould.

7 Claims, 2 Drawing Sheets

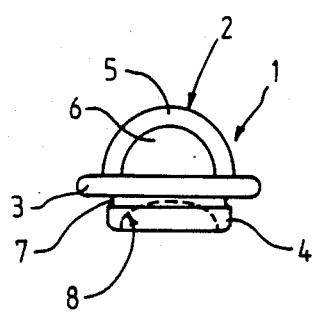 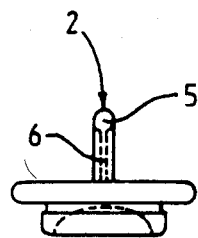
FIG. 1  FIG. 2
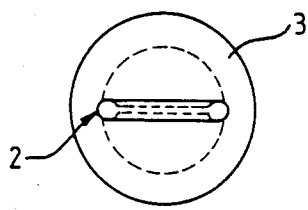
FIG. 3

METHOD OF AND APPARATUS FOR MANUFACTURING A GLASS OBJECT

The present invention relates to a method of manufacturing a glass object having protrusions and/or recesses, for example a glass lid provided with a handle, by pressing molten glass in a mould which is filled from the top.

Objects of glass can be made by pressing molten glass in a press equipped with a revolving table or in a so-called Individual Section machine or IS machine.

In a press equipped with a revolving table, moulds are filled one by one by supplying a drop of glass to each mould, the weight of each drop corresponding to the weight of the product to be made. After one mould is filled the table revolves so as to bring the subsequent mould to the filling position. A plunger descending from above presses the molten glass in each mould to the shape of the mould. The cooled glass object is removed from the machine by opening the mould and lifting the finished product onto an adjacent conveyor.

In an IS machine several adjacent parison moulds are filled simultaneouly from the top. The parison mould, after it has been closed with the cover, is used for forming a parison of the glass object from below either by blowing with pressurized air or with a plunger pushing into the mould after which the parison is transferred to a shaping mould in which the glass object is formed to its final shape by blowing from the top.

If the product to be made is a glass lid with a flat handle, it can be made in a press having a revolving table in a position where the handle of the lid is extends downwardly.

However, when the mould is opened the lid will fall over. Therefore it is difficult to lift the lid onto a conveyor for transporting it further to heat treatment and the lid is in an incorrect disposition on the conveyor.

The operation of a press equipped with a revolving table must be interrupted if one of the moulds is broken and must be replaced. The operation of an IS machine can continue if one of its sectors is stopped for changing a mould.

As the production capacity of an IS machine is higher than that of a press, production of glass goods with an IS machine is desirable. However, manufacture of many glass objects, for example lids with a handle, with an IS machine has not until now been possible because of the structure and the operation principle of the machine.

The object of the invention is to make possible the use of an IS machine in the production of glass objects pressed from above.

The method according to the present invention makes possible production of concave glass objects with an IS machine, the outer surface of which objects has no edging at the concave part which is upwardly directed during the pressing phase.

The method according to the present invention is characterized in that molten glass is pressed in an IS machine from above with the cover of a mould, in a mould defined by said cover, by a shaping mould and by a mouth mould disposed under the shaping mould in such a way that at least part of the protrusions or recesses in the outer surface of the produced glass object (1) are in the mouth mould so that the mouth mould can grip them; that the glass object is transferred with the mouth mould to a finishing mould (12) and turned at the same time through 180° after which the mouth mould is opened; and that the glass object is cooled supported by the finishing mould.

Since the glass object is cooled in the finishing mould supported by said mould, glass objects of great thickness variations can be manufactured without the object being distorted or deformed during the cooling phase. A two-stage manufacturing method further provides more versatile possibilities to control the manufacturing process.

The invention will be described further below, by way of example, with reference to the accompanying drawings in which;

FIGS. 1 to 3 illustrate as two side elevations at ninety degrees to each other and a plan view, a product manufactured by the method of the present invention; and FIG. 4 is a schematical illustration of an apparatus being applied for carrying out the method of the invention.

FIGS. 1 to 3 illustrate a glass lid comprising a flat handle 2, a round disc or flange 3 and a cylindrical guide portion 4. The edge 5 of the handle is thicker than the reinforcing portion 6 between the edge and the flange 3. There is a groove 7 for a sealing ring between the guide portion 4 and the flange. There is a recess 8 in the end of the guide portion 4.

FIG. 4 is a vertical section through an IS machine provided with shaping moulds 11 and finishing moulds 12 in two adjacent rows. Both the moulds are made up of two mould halves, thus they can be opened. There is a mouth mould 13 under the shaping mould 11 which mouth mould closes the shaping mould from the bottom. The mouth mould, also, is made up of two halves and can be opened. The finishing mould is closed by a bottom or base 14.

A turning arm 16 is provided for displacing and inverting products and is turnably pivoted in the body 15 of the machine for transferring the mouth mould 13 from under the shaping mould 11 onto the finishing mould 12 and thus moving the formed product from the shaping mould to the finishing mould and inverting it at the same time.

The product illustrated in FIGS. 1 to 3 is manufactured the following way:

When a drop of molten glass the weight of which is the same as that of the finished product is dropped from above to the opened shaping mould 11, the molten glass already partly runs to the mouth mould 13, after which the mould is closed from above by a cover 17 which presses the molten glass to the shape determined by said cover, the shaping mould and the mouth mould. The handle 2 of the glass lid 1 formed in this way lies in the mouth mould and is turned upside down relative to the intended normal position of use, and the flange 3 lies between the shaping mould and the mouth mould, and the cover 17 produces the recess 8 in the guide portion of the glass lid. Subsequently, the arm (not illustrated) of the cover 17 lifts the cover and turns it aside, the shaping mould 11 is opened and the turning arm 16 of the mouth mould 13 turns the mouth mould and the product in it over onto the base 14 of the finishing mould 12 and into a position in which the handle of the lid extends upwards with the finishing mould being open. Subsequently the finishing mould is closed and the mouth mould is opened. The turning arm 16 of the mouth mould returns the mouth mould to the initial position illustrated at the left-hand side of the Figure and at the same time closes it. No further shaping takes place in the finishing mould 12, the product is only cooled in it and after that lifted onto an adjacent conveyor in a position where the handle extends upwardly. The conveyor transports the object further for heat treatment.

The invention employs a modified IS machine the construction of which is simplified as no blowing is needed.

The invention is not intended to be limited by the embodiment disclosed here by way of example but it can be modified within the scope of protection defined by the appended patent claims. The handle of the glass lid described in the embodiment can be solid, or alternatively open.

We claim:

1. A method of manufacturing a glass object having protrusions and/or recesses utilizing an Individual Section machine having a mold comprising a shaping mold and a mouth mold, and an open top with a cover for closing the top, and a finishing mold remote from the shaping mold, comprising the steps of sequentially:
   (a) putting molten glass into the mouth and shaping molds while the mouth mold is disposed under the shaping mold;
   (b) utilizing the cover, pressing the molten glass into its final shape from above in such a way that at least a part of the protrusions or recesses in the outer surface of the glass object produced are in the mouth mold so that the mouth mold grips them and holds them in place;
   (c) transferring the glass object, along with the mouth mold, to the finishing mold while at the same time rotating the mouth mold and glass object 180° about a horizontal axis;
   (d) opening the mouth mold so that the glass object is released into the finishing mold;
   (e) returning the mouth mold to its initial position under the shaping mold; and
   (f) cooling the glass object while it is supported by the finishing mold.

2. A method as recited in claim 1 wherein step (f) is practiced, in part, by closing the finishing mold and cooling the glass object while it is within the closed finishing mold.

3. A method as recited in claim 2 wherein the object to be produced is a glass lid having a handle, and wherein step (b) is practiced by pressing the molten glass into the shaping mold with the handle of the glass lid projecting downwardly and positioned within the mouth mold, and wherein steps (c), (d), and (f) are practiced so that the glass object is transferred to the finishing mold with the handle projecting upwardly, and is cooled in the finishing mold with the handle projecting upwardly.

4. A method as recited in claim 1 wherein the object to be produced is a glass lid having a handle, and wherein step (b) is practiced by pressing the molten glass into the shaping mold with the handle of the glass lid projecting downwardly and positioned within the mouth mold, and wherein steps (c), (d), and (f) are practiced so that the glass object is transferred to the finishing mold with the handle projecting upwardly, and is cooled in the finishing mold with the handle projecting upwardly.

5. A method of manufacturing a glass lid with a handle having protrusions and/or recesses utilizing an Individual Section machine having a mold comprising a shaping mold and a mouth mold, and an open top with a cover for closing the top, and a finishing mold remote from the shaping mold, comprising the steps of sequentially:
   (a) putting molten glass into the mouth and shaping molds while the mouth mold is disposed under the shaping mold;
   (b) utilizing the cover, pressing the molten glass into its lid with handle shape from above in such a way that the handle projects downwardly into the mouth mold and is situated in and held by the mouth mold so that the mouth mold grips the handle and holds it in place;
   (c) transferring the glass lid, along with the mouth mold, to the finishing mold while at the same time rotating the mouth mold and glass lid 180° about a horizontal axis, so that the handle projects upwardly;
   (d) opening the mouth mold so that the glass lid is released into the finishing mold;
   (e) returning the mouth mold to its initial position under the shaping mold; and
   (f) cooling the glass lid while it is supported by the finishing mold, with the handle projecting upwardly from the finishing mold.

6. An Individual Section machine for pressing molten glass comprising a shaping mold; a mouth mold; means for mounting the mouth mold so that it may be disposed under the shaping mold to cooperate therewith, yet is movable to a position remote from the shaping mold; said shaping and mouth molds having an open top; a cover for closing said open mold top and for pressing molten glass into the molds; a finishing mold having an open top; and means for transferring the mouth mold from a position below the shaping mold to a position on top of the finishing mold, including means for rotating the mouth mold 180° about a horizontal axis while moving from the shaping mold to the finishing mold.

7. A machine as recited in claim 6 further comprising a removable cover for covering said finishing mold.

* * * * *